United States Patent

Edwards et al.

[11] Patent Number: 5,832,567
[45] Date of Patent: Nov. 10, 1998

[54] CABLE TIE WITH SAFETY GUARD

[75] Inventors: John B. Edwards, Dallas; Kenneth M. Draganski, Rowlett, both of Tex.

[73] Assignee: DSC Telecom L.P., Plano, Tex.

[21] Appl. No.: 901,774

[22] Filed: Jul. 28, 1997

Related U.S. Application Data

[60] Provisional application No. 60/048,041, May 30, 1997.

[51] Int. Cl.[6] .................................................... B65D 63/10
[52] U.S. Cl. ...................................... 24/16 PB; 24/30.5 P
[58] Field of Search ..................................... 292/318–322, 292/325; 24/16 R, 16 PB, 30.5 R, 30.5 P, 17 AP; 248/74.3

[56] References Cited

U.S. PATENT DOCUMENTS

| | | | |
|---|---|---|---|
| 3,708,835 | 1/1973 | Bienz | 24/16 PB |
| 4,708,306 | 11/1987 | Mitomi | 248/74.3 |
| 4,902,055 | 2/1990 | Scott et al. | 292/319 |
| 5,088,159 | 2/1992 | Lafleur | 24/16 PB |
| 5,123,686 | 6/1992 | Wenk | 292/321 |
| 5,193,254 | 3/1993 | Geisinger | 24/16 PB X |
| 5,356,417 | 10/1994 | Golds | 606/151 |
| 5,377,388 | 1/1995 | DeBever | 24/16 PB |
| 5,457,853 | 10/1995 | Klein | 24/16 PB |
| 5,636,412 | 6/1997 | Lodi et al. | 24/16 PB |

*Primary Examiner*—James R. Brittain
*Attorney, Agent, or Firm*—Baker & Botts, L.L.P.

[57] ABSTRACT

A cable tie (10) includes a tie portion (12) and a head portion (14). The tie portion (12) is inserted through a slot (16) of the head portion (14). The slot (16) allows for insertion of the tie portion (12) and prevents de-insertion of the tie portion (12). After insertion, an excess length 22 of the tie portion (12) is trimmed away leaving a remaining edge (24). The head portion (14) includes a safety guard (18) attached by a flexible hinge (20) that snaps onto the head portion (14) to enclose the remaining edge (24).

3 Claims, 2 Drawing Sheets

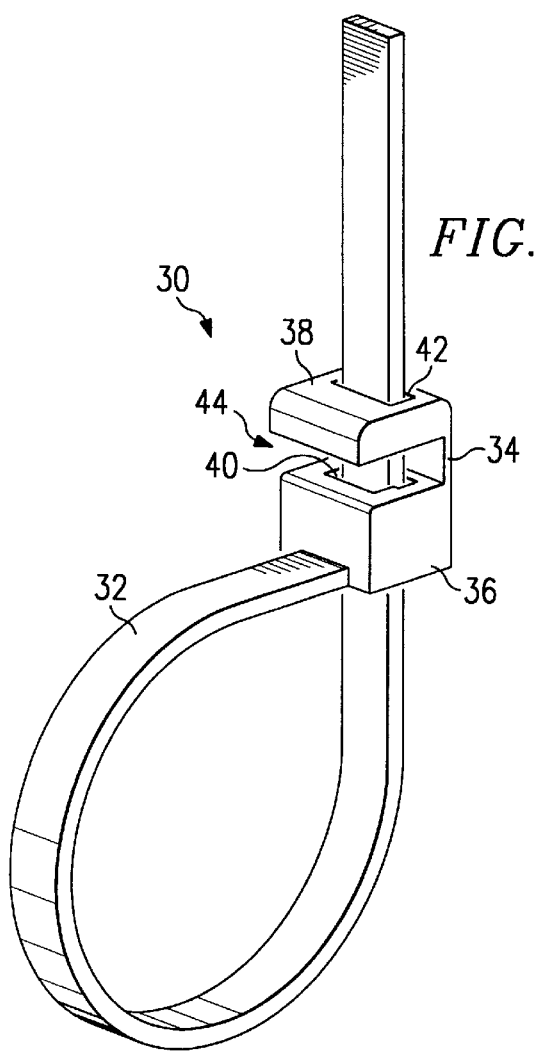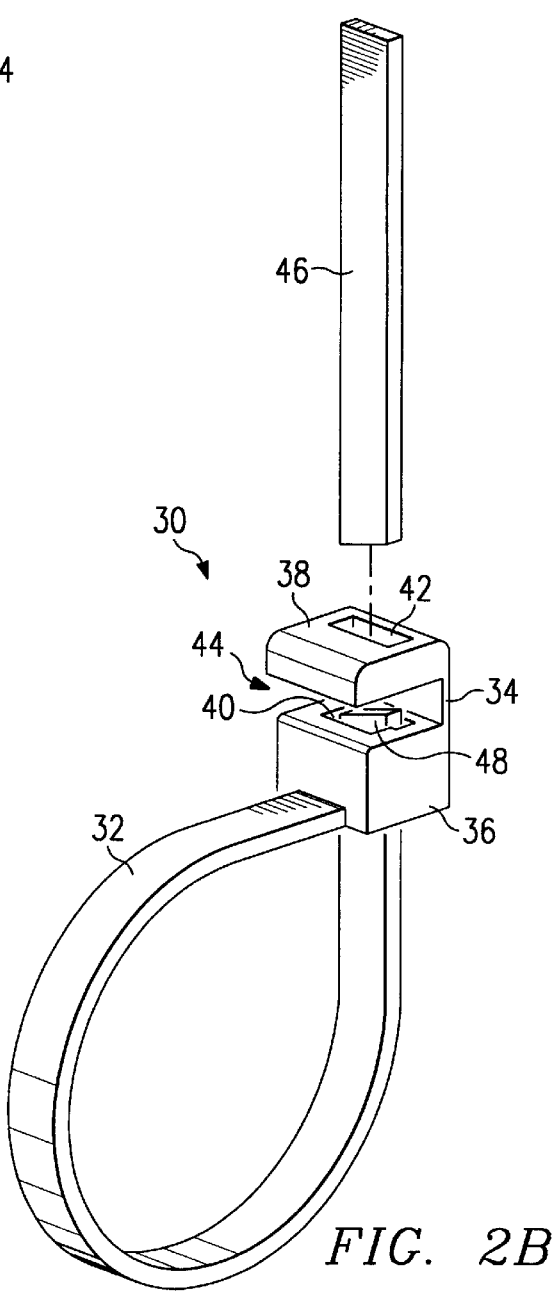

CABLE TIE WITH SAFETY GUARD

TECHNICAL FIELD OF THE INVENTION

The present invention relates in general to cable bundling techniques and more particularly to a cable tie with safety guard.

CROSS REFERENCE TO RELATED APPLICATIONS

This application claims the benefit of U.S. Provisional Application No. 60/048,041 filed on May 30, 1997.

BACKGROUND OF THE INVENTION

Typical cable ties used with telecommunications equipment leave excess tie length when tightened through the head slot around cables. The excess tie length is trimmed off and discarded. However, the remaining bit of tie length has a sharp edge as a result of the trimming process. This sharp edge presents a safety hazard when handling telecommunications cabling. Therefore, it is desirable to eliminate the safety risk involved with sharp edged tie remnants.

SUMMARY OF THE INVENTION

From the foregoing, it may be appreciated that a need has arisen for a cable tie that does not leave exposed sharp edges after trimming. In accordance with the present invention, a cable tie with safety guard is provided that substantially eliminates or reduces problems associated with conventional cable ties.

According to an embodiment of the present invention, there is provided a cable tie with safety guard that includes a tie portion that is insertable into a slot of a head portion. The head portion includes a safety cap flexibly hinged to the head portion. After insertion into the slot of the head portion, excess length of the tie portion is trimmed off. The safety cap secures over the head portion to enclose a remaining part of the tie portion extending above the head portion. In an alternate embodiment, the head portion includes a lower body and an upper body separated by a recess. The tie portion is inserted through the lower body and the upper body of the head portion. After insertion, excess length of the tie portion is trimmed off within the recess such that a remaining part of the tie portion does not extend beyond the upper body of the head portion.

The present invention provides various technical advantages over conventional cable ties. For example, one technical advantage is to prevent a sharp edge of a tie length from being exposed. Another technical advantage is to enclose the sharp edge of a tie length. Other technical advantages may be readily apparent to those skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 2A and 2B illustrate a simplified diagram of an alternative cable tie with safety guard.

DETAILED DESCRIPTION OF THE INVENTION

Figure 1A:
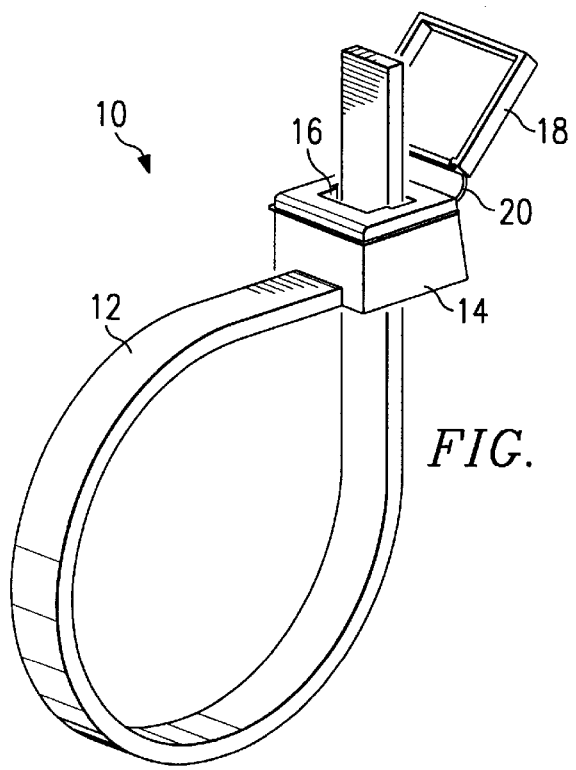
FIGS. 1A and 1B illustrate a simplified diagram of a cable tie with safety guard.
Figure 1B:
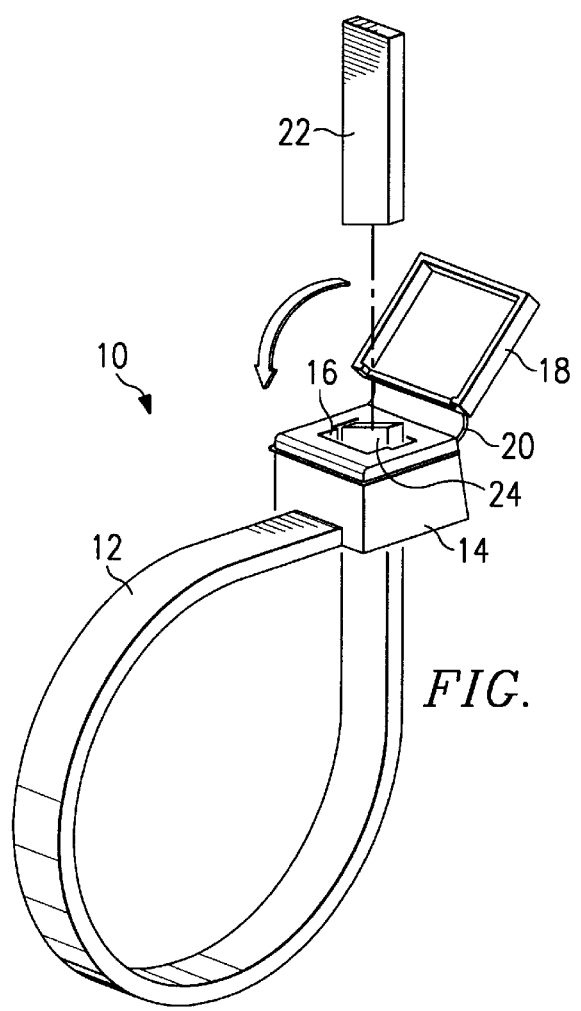

FIGS. 1A and 1B are simplified diagrams of a cable tie 10. Cable tie 10 includes a tie portion 12 and a head portion 14. Head portion 14 includes a slot 16 for receiving tie portion 12. Tie portion 12 may have teeth that can make contact with a gear within slot 16 to allow tie portion 12 to be inserted into slot 16 and prevent tie portion 12 from being de-inserted from slot 16. Head portion 14 also includes a safety guard 18 that is connected to head portion 14 by a flexible hinge mechanism 20

FIG. 1A shows insertion of tie portion 12 prior to trimming. FIG. 1B shows cable tie 10 after trimming. After insertion into slot 16, an excess length 22 is trimmed off of tie portion 12 leaving a remaining edge 24 extending above head portion 14. Safety guard 18 snaps into place on head portion 14 to enclose remaining edge 24. In this manner, safety guard 18 prevents remaining edge 24 from scratching or cutting anything. Preferably, safety guard 18 has sufficient depth to accept an approximate 1/16th of an inch length for remaining edge 24 and allow further insertion of tie portion 12 through slot 16.

FIGS. 2A and 2B are simplified diagrams of an alternative cable tie 30. Cable tie 30 includes a tie portion 32 and a head portion 34. Head portion 34 includes a lower body 36 and an upper body 38. Lower body 36 includes a slot 40 similar to slot 16 of cable tie 10. Upper body 38 includes a pass through slot 42. Lower body 36 is separated from upper body 38 by a recess area 44. Tie portion 32 is inserted through slot 40 of lower body 36 and pass through slot 42 of upper body 38.

FIG. 2A shows cable tie 30 after insertion of tie portion 32 into head portion 34 and prior to trimming. FIG. 2B shows cable tie 30 after trimming is performed. After insertion of tie portion 32 into head portion 34, excess length 46 of tie portion 32 is trimmed away. Trimming is performed within recess area 44 such that a remaining edge 48 of tie portion 32 extends beyond lower body 36 but not upper body 38. In this manner, upper body 38 acts as a safety guard to prevent remaining edge 48 from scratching or cutting anything.

Thus, it is apparent that there has been provided, in accordance with the present invention, a cable tie with safety guard that satisfies the advantages set forth above. Although the present invention has been described in detail, it should be understood that various changes, substitutions, and alterations may be readily ascertainable by those skilled in the art and may be made without departing from the spirit and scope of the present invention as defined by the following claims.

What is claimed is:

1. A cable tie comprising:

a tie portion;

a head portion connected to the tie portion, the tie portion operable to insert within a slot of the head portion;

a safety guard fixedly connected to the head portion, the safety guard separated from the head portion by a recess area, the recess area operable to provide sufficient room to allow for removal of an excess end of the portion such that the tie portion is operable to extend beyond the head portion into the recess area and not beyond the safety guard.

2. The cable tie of claim 1, wherein the tie portion includes teeth, the slot having a flange to receive the teeth of the tie portion to allow insertion of the tie portion through the slot and prevent de-insertion of the tie portion through the slot.

3. The cable tie of claim 1, wherein the head portion and the safety guard have a generally rectangular cross sectional shape, the recess extending over three sides of the head portion and the safety guard.

* * * * *